(12) United States Patent
Ohashi et al.

(10) Patent No.: US 11,461,249 B2
(45) Date of Patent: Oct. 4, 2022

(54) SYSTEM, PROCESSING DEVICE, AND NON-TRANSITORY STORAGE MEDIUM

(71) Applicant: KABUSHIKI KAISHA TOKAI RIKA DENKI SEISAKUSHO, Aichi (JP)

(72) Inventors: Yosuke Ohashi, Aichi (JP); Yosuke Hasegawa, Aichi (JP); Takanori Matsuyama, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/233,934

(22) Filed: Apr. 19, 2021

(65) Prior Publication Data

US 2021/0382833 A1    Dec. 9, 2021

(30) Foreign Application Priority Data

Jun. 4, 2020 (JP) .............................. JP2020-097779

(51) Int. Cl.
*G06F 13/14* (2006.01)

(52) U.S. Cl.
CPC .......... *G06F 13/14* (2013.01); *G06F 2213/40* (2013.01)

(58) Field of Classification Search
None
See application file for complete search history.

(56) References Cited

U.S. PATENT DOCUMENTS

| 10,802,888 | B2 * | 10/2020 | Anami | .................... G06F 21/62 |
| 2005/0071866 | A1 * | 3/2005 | Louzir | ................. H04N 21/434 |
| | | | | 348/E5.005 |
| 2019/0021592 | A1 * | 1/2019 | Matsui | ..................... A61B 5/00 |
| 2019/0332464 | A1 * | 10/2019 | Nakamura | .............. G06F 11/10 |
| 2022/0022154 | A1 * | 1/2022 | Hong | .................... H04W 60/00 |

FOREIGN PATENT DOCUMENTS

JP    2019-193112    10/2019

* cited by examiner

*Primary Examiner* — Michael Sun
(74) *Attorney, Agent, or Firm* — Greenblum & Bernstein, P.L.C.

(57) ABSTRACT

To provide a structure capable of more reliably completing a series of processes performed by a plurality of devices. There is provided a system comprising: a plurality of processing devices that execute a predetermined process according to an input process request, wherein each of the plurality of processing devices is connected to at least one other processing device such that information is transmittable, wherein the process request is input from an external device connected to any of the plurality of processing devices, and wherein each of the plurality of processing devices starts the predetermined process on the basis of, among the other processing devices, all processing devices receiving information from the external device via the processing device having completed the predetermined process normally.

6 Claims, 4 Drawing Sheets

SYSTEM, PROCESSING DEVICE, AND NON-TRANSITORY STORAGE MEDIUM

CROSS REFERENCE TO RELATED APPLICATION(S)

This application is based upon and claims benefit of priority from Japanese Patent Application No. 2020-097779, filed on Jun. 4, 2020, the entire contents of which are incorporated herein by reference.

BACKGROUND

The present invention relates to a system, a processing device, and a non-transitory storage medium.

In recent years, many systems that operate through cooperation among a plurality of devices have been developed. For example, Japanese Unexamined Patent Application Publication No. 2019-193112 discloses a system including a master and a plurality of slaves.

SUMMARY

However, in the above-described system, when an error occurs in any device in a case where a plurality of devices sequentially perform processes, there is a problem in that processes performed by other devices before the occurrence of the error may be wasted or the devices may be required to be restored to a state before execution of the processes.

Therefore, the present invention has been made in view of the problem, and an object of the present invention is to provide a structure capable of more reliably completing a series of processes performed by a plurality of devices.

To solve the above described problem, according to an aspect of the present invention, there is provided a system comprising: a plurality of processing devices that execute a predetermined process according to an input process request, wherein each of the plurality of processing devices is connected to at least one other processing device such that information is transmittable, wherein the process request is input from an external device connected to any of the plurality of processing devices, and wherein each of the plurality of processing devices starts the predetermined process on the basis of, among the other processing devices, all processing devices receiving information from the external device via the processing device having completed the predetermined process normally.

To solve the above described problem, according to another aspect of the present invention, there is provided a processing device that is connected to a plurality of devices of the same type and executes a predetermined process according to a process request, the process request being input to any of the plurality of devices of the same type from an external device, the processing device comprising: a processing unit that starts the predetermined process on the basis of, among the plurality of devices of the same type, all devices of the same type receiving information from the external device via the processing device having completed the predetermined process normally.

To solve the above described problem, according to another aspect of the present invention, there is provided a non-transitory storage medium storing a program causing a computer to function as a processing device that is connected to a plurality of devices of the same type and executes a predetermined process according to a process request, the process request being input to any of the plurality of devices of the same type from an external device, the program causing the processing device to: start the predetermined process on the basis of, among the plurality of devices of the same type, all devices of the same type receiving information from the external device via the processing device having completed the predetermined process normally.

As described above, according to the present invention, it is possible to provide a structure capable of more reliably completing a series of processes performed by a plurality of devices.

DETAILED DESCRIPTION OF THE EMBODIMENT(S)

Figure 1:
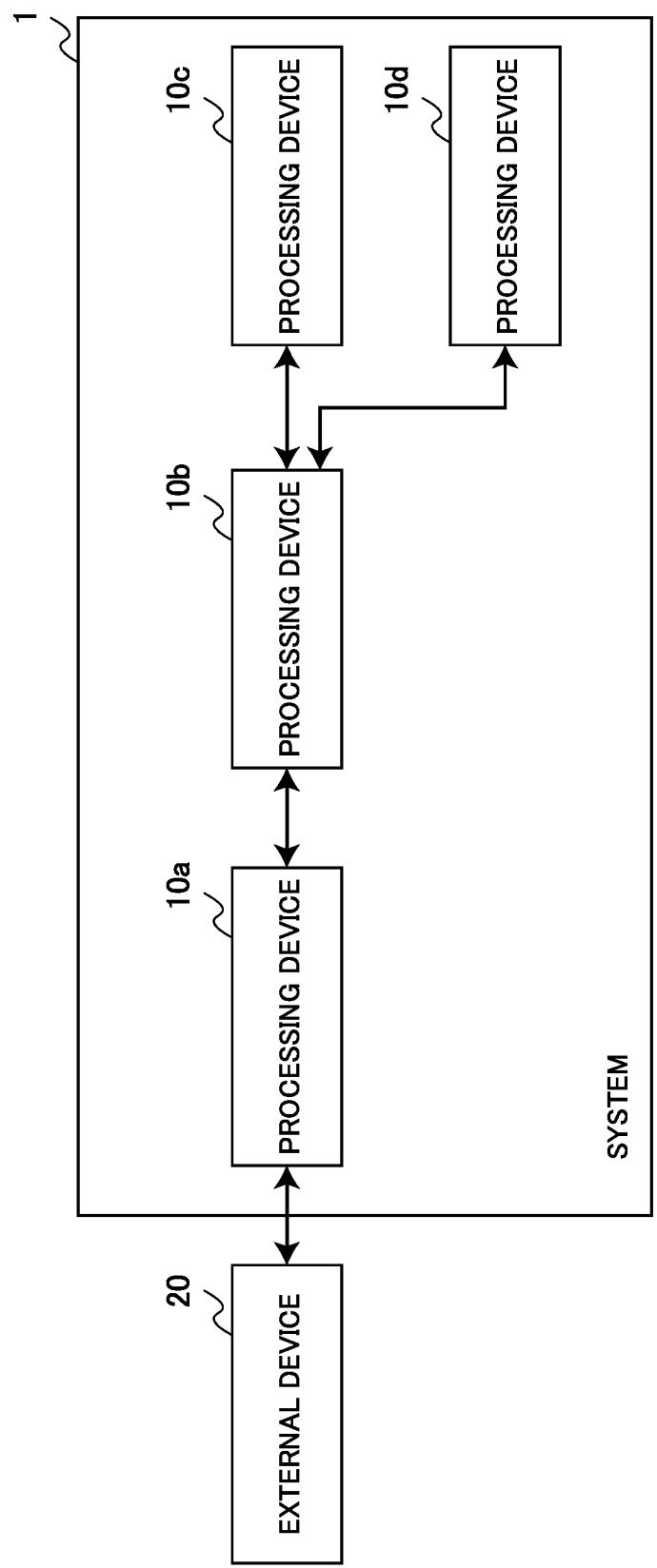
FIG. 1 is a block diagram illustrating a configuration example of a system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

<<1.1. System Configuration Example>>

First, a configuration example of a system 1 according to an embodiment of the present invention will be described. FIG. 1 is a block diagram illustrating a configuration example of a system 1 according to an embodiment of the present invention. As illustrated in FIG. 1, the system 1 according to the present embodiment includes a plurality of processing devices 10. Any one of the plurality of processing devices 10 is connected to an external device 20.

(Processing Device 10)

The processing device 10 according to the present embodiment is an information processing device that executes a predetermined process according to an input process request. Each of the plurality of processing devices 10 according to the present embodiment is able to transmit information by being connected to at least one other processing device to.

In the system 1 according to the present embodiment, a process request is input from the external device 20 connected to any of the plurality of processing devices 10.

Each of the plurality of processing devices 10 according to the present embodiment may transmit the input process request to at least one other processing device not having received the process request yet.

For example, FIG. 1 exemplifies a case where the system 1 according to the present embodiment includes four processing devices 10a to 10d. In the example illustrated in FIG. 1, the processing device 10a is connected to the external device 20.

In this case, the processing device 10a is able to transmit information by being connected to the processing device 10b among the other processing devices 10b to 10d. The processing device 10a transmits information including the process request that is input from the external device 20 to the processing device 10b.

The processing device 10b is able to transmit information by being connected to the other processing devices 10a, 10c, and 10d. The processing device 10b transmits the information received from the external device 20 via the processing device 10a to the processing devices 10c and 10d.

The processing device 10c is able to transmit information by being connected to the processing device 10b among the other processing devices 10a, 10b, and 10d. The processing device 10c receives information from the external device 20 via the processing devices 10a and 10b.

Similarly, the processing device 10d is able to transmit information by being connected to the processing device 10b among the other processing devices 10a to 10c. The processing device 10d receives information from the external device 20 via the processing devices 10a and 10b.

Each of the plurality of processing devices 10 according to the present embodiment receives information including a process request issued by the external device 20 through the above information transmission, and executes a predetermined process on the basis of the information.

Examples of the processing device 10 according to the present embodiment include a communication device performing wireless communication using, for example, an ultra-wide band (UWB) frequency.

FIG. 1 exemplifies a case where the system 1 according to the present embodiment includes the four processing devices 10a to 10d, but the number of processing devices 10 included in the system 1 according to the present embodiment is not limited to such an example. The system 1 according to the present embodiment may include two or more or any number of processing devices 10.

The information transmission relationship between the plurality of processing devices 10 illustrated in FIG. 1 is only an example. In the system 1 according to the present embodiment, an information transmission relationship between the plurality of processing devices 10 may be freely configured.

For example, the plurality of processing devices 10 according to the present embodiment may be connected in series to each other to be able to transmit information.

As an example, in a case where the system 1 includes four processing devices 10a to 10d, information that is input to the system 1 from the external device 20 may be transmitted in an order of the processing devices 10a, 10b, 10c, and 10d.

For example, the plurality of processing devices 10 according to the present embodiment may be classified as a single processing device 10 that operates as a master on the basis of information that is directly input from the external device 20 and other processing devices 10 that operate as slaves acquiring information from the external device 20 via the processing device 10 operating as the master.

As an example, in a case where the system 1 includes four processing devices 10a to 10d, the processing device 10a that operates as a master may control the processing devices 10b to 10d that operate as slaves on the basis of information that is directly input from the external device 20. In this case, each of the processing devices 10b to 10d operating as slaves may receive information from the external device 20 via the processing device 10a and perform a process on the basis of the information.

As mentioned above, the configuration example of the system 1 according to the present embodiment has been described. As described above, in the system 1 according to the present embodiment, information including a process request that is input from the external device 20 is transmitted among a plurality of processing devices 10, and each of the plurality of processing devices 10 executes a predetermined process on the basis of the received information.

Here, one feature of each of the plurality of processing devices 10 according to the present embodiment is to start a predetermined process on the basis of, among the other processing devices 10, all of the processing devices receiving information from the external device 20 via the processing device 10 having completed the predetermined process normally.

According to this feature, it is possible to more reliably complete a series of processes performed by a plurality of devices. Details of functions of the plurality of processing devices 10 according to the present embodiment will be described later.

(External Device 20)

The external device 20 according to the present embodiment is a device that inputs information including a process request to any of a plurality of processing devices 10 included in the system 1. The external device 20 according to the present embodiment is connected to any one of the plurality of processing devices 10 through wired communication or wireless communication to be able to transmit information.

<<1.2. Functional Configuration Example of Processing Device 10>>

Figure 2:
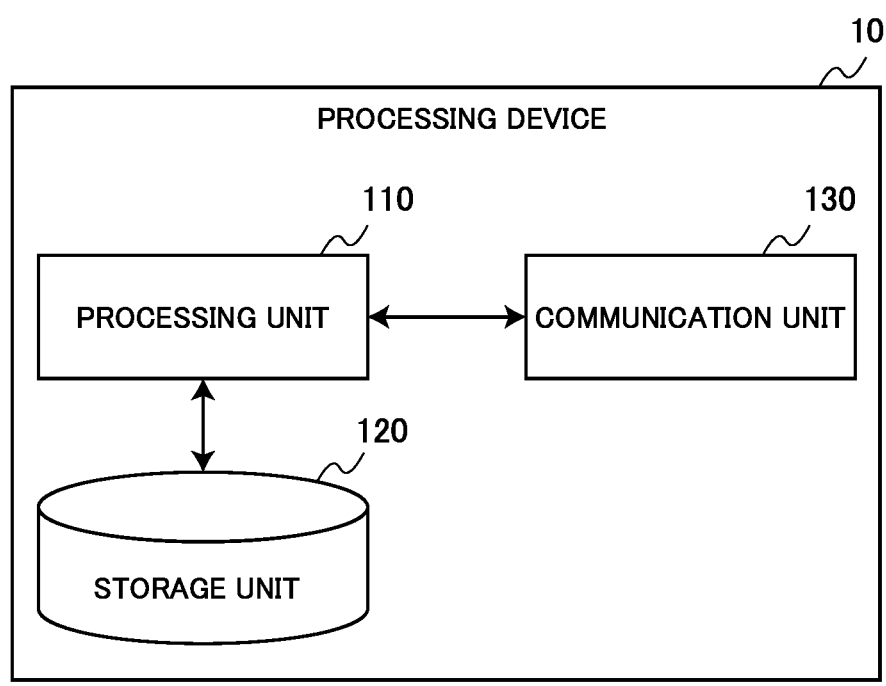
FIG. 2 is a block diagram illustrating a configuration example of a processing device 10 according to the embodiment.

Next, a functional configuration example of the processing device 10 according to the present embodiment will be described. FIG. 2 is a block diagram illustrating a functional configuration example of the processing device 10 according to the present embodiment. As illustrated in FIG. 2, the processing device 10 according to the present embodiment includes at least a processing unit 110, a storage unit 120, and a communication unit 130.

(Processing Unit 110)

The processing unit 110 according to the present embodiment executes various processes on the basis of input information. For example, on the basis of an input process request, the processing unit 110 according to the present embodiment executes a predetermined process corresponding to the process request.

One feature of processing unit 110 according to the present embodiment is to start a predetermined process on the basis of, among a plurality of processing devices 10 included in the system 1, all of the processing devices 10 receiving information from the external device 20 via the processing device 10 having completed the predetermined process normally.

The functions of the processing unit 110 according to the present embodiment are realized by various processors. Details of the functions of the processing unit 110 according to the present embodiment will be described later.

(Storage Unit 120)

The storage unit 120 according to the present embodiment stores various pieces of information used for processes performed by the processing device 10. For example, the storage unit 120 stores various programs used in the processing unit 110.

(Communication Unit 130)

The communication unit 130 according to the present embodiment performs information communication with at least one other processing device 10. For example, the communication unit 130 transmits information from the external device 20 to at least one other processing device 10, or acquires the information from the external device 20 via another processing device 10. The communication unit 130 according to the present embodiment may perform information communication with the external device 20. In this case, the communication unit 130 receives information including a process request from the external device 20.

As described above, the functional configuration example of the processing device 10 according to the present embodiment has been described. The functional configuration described with reference to FIG. 2 is only an example, and a functional configuration of the processing device 10 according to the present embodiment is not limited to such an example. The functional configuration of the processing device 10 according to the present embodiment may be flexibly modified according to specifications or operations.

<<1.3. Flow of Processes>>

Next, a flow of processes in the system 1 according to the present embodiment will be described in detail. In the system 1 according to the present embodiment, information including a process request that is input from the external device 20 is transmitted among a plurality of processing devices 10 according to a flow of data.

Each of the plurality of processing devices 10 executes a predetermined process on the basis of the process request acquired according to the flow of data.

An example of the predetermined process may include a process related to, for example, a cooperative operation among a plurality of processing devices 10.

The process related to the cooperative operation among the plurality of processing devices 10 may be, for example, a process of registering pairing between the processing devices 10 in order to perform the cooperative operation, or a process of canceling the pairing.

According to the flow of such a process, a plurality of processing devices 10 acquiring information from the external device 20 according to a flow of data can register or cancel pairing in order, and thus it is possible to improve processing efficiency as a whole.

However, as in the system 1 according to the present embodiment, in a system in which a plurality of devices sequentially executes processes, when an error occurs in any device, there is a problem in that a process performed by another device before the occurrence of the error will be wasted or the device is required to be restored to a state before the execution of the process.

Here, in order to describe features of the system 1 according to the present embodiment, a flow of processes in a comparison target system 8 will be described first.

Figure 3:
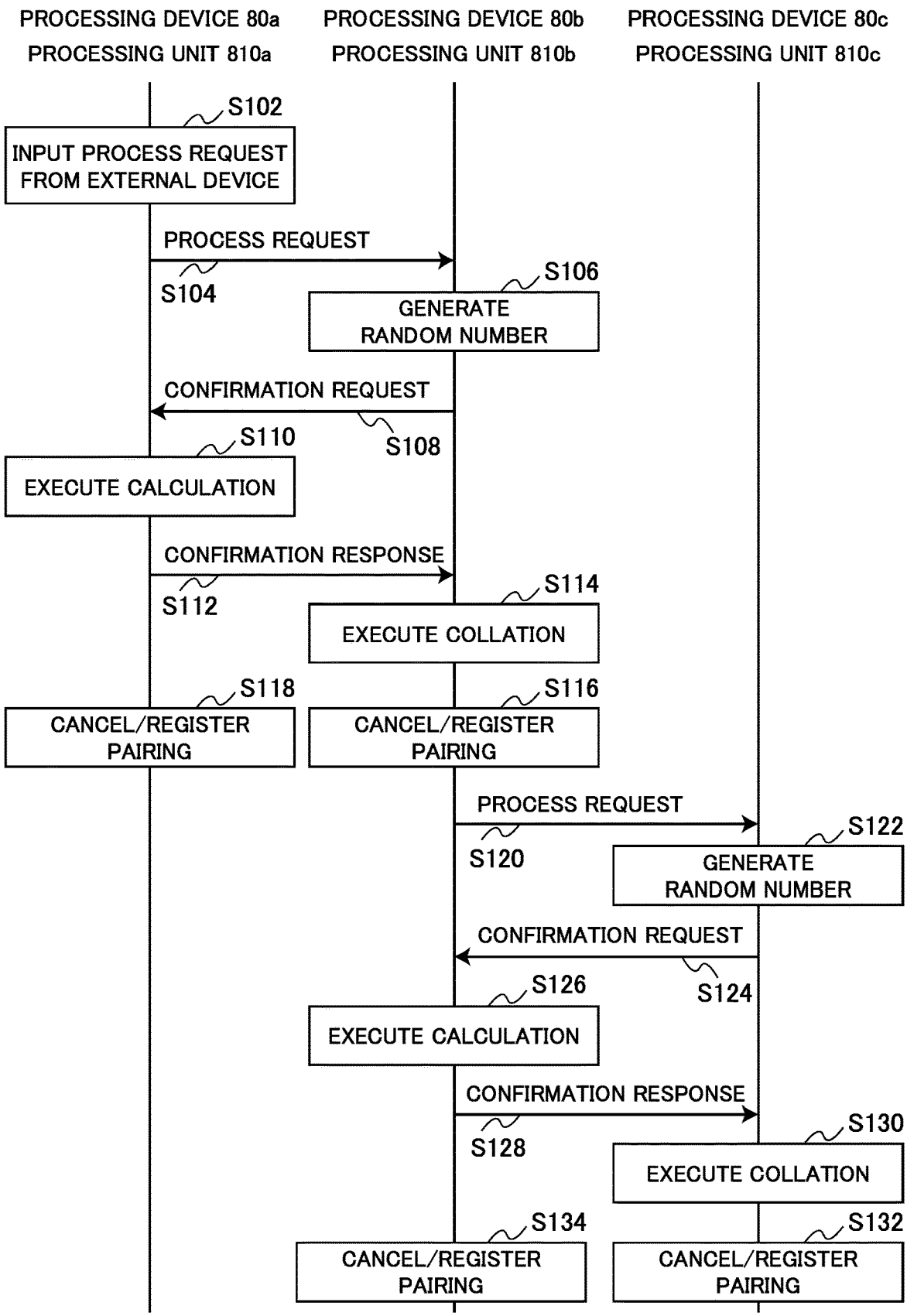
FIG. 3 is a sequence diagram illustrating an example of a flow of processes performed by a comparison target system 8.

FIG. 3 is a sequence diagram illustrating an example of a flow of processes in the comparison target system 8. In the example illustrated in FIG. 3, the comparison target system 8 includes three processing devices 80*a* to 80*c* corresponding to the processing devices 10 according to the present embodiment.

In FIG. 3, it is assumed that the processing device 80*a* is connected to an external device 90 corresponding to the external device 20 according to the present embodiment. In FIG. 3, it is assumed that the processing device 80*a* and the processing device 80*b* are connected to each other to be able to transmit information, and the processing device 80*b* and the processing device 80*c* are connected to each other to be able to transmit information.

In the following description, a case where a predetermined process executed by each processing device 80 according to a process request is the process of registering or canceling pairing will be described.

In this case, in the processes in the comparison target system 8, first, a process request is input to the processing device 80*a* from the external device 90 (S102).

Next, a processing unit 810*a* of the processing device 80*a* performs control such that the process request that is input in step S102 is transmitted to the processing device 80*b* (S104).

Next, a processing unit 810*b* of the processing device 80*b* generates a random number on the basis of the process request that is input in step S104 (S106).

The processing unit 810*b* of the processing device 80*b* performs control such that a confirmation request including the random number generated in step S106 is input to the processing device 80*a* (S108).

Next, the processing unit 810*a* of the processing device 80*a* executes calculation based on the random number included in the confirmation request that is input in step S108 (S110).

The processing unit 810*a* of the processing device 80*a* performs control such that a confirmation response including a result of the calculation executed in step S110 is input to the processing device 80*b* (S112).

Next, the processing unit 810*b* of the processing device 80*b* performs collation based on the calculation result included in the confirmation response that is input in step S112 (S114). For example, the processing unit 810*b* may determine whether or not a result of calculation using the random number generated in step S106 and a code shared in advance between the processing devices 80*a* and 80*b* matches the calculation result included in the confirmation response.

Here, in a case where the authenticity of the processing device 80*a* is recognized as a result of the collation based on the calculation result included in the confirmation response, the processing unit 810*b* of the processing device 80*b* performs a process related to registration or cancelation of pairing between the processing device 80*a* and the processing device 80*b* according to the process request that is input in step S104 (S116).

Similarly, the processing unit 810*a* of the processing device 80*a* also performs a process related to registration or cancelation of pairing (S118).

Next, the processing unit 810*b* of the processing device 80*b* that executes the predetermined process in step S116 performs control such that the process request that is input in step S104 is transmitted to the processing device 80*c* (S120).

Next, a processing unit 810*c* of the processing device 80*c* generates a random number on the basis of the process request that is input in step S120 (S122).

The processing unit 810*c* of the processing device 80*c* performs control such that a confirmation request including the random number generated in step S122 is input to the processing device 80*b* (S124).

Next, the processing unit 810*b* of the processing device 80*b* executes calculation based on the random number included in the confirmation request that is input in step S124 (S126).

The processing unit 810*b* of the processing device 80*b* performs control such that a confirmation response including a result of the calculation executed in step S126 is input to the processing device 80*c* (S128).

Next, the processing unit 810*c* of the processing device 80*c* performs collation based on the calculation result included in the confirmation response that is input in step S128 (S130).

Here, in a case where the authenticity of the processing device 80*b* is recognized as a result of the collation based on the calculation result included in the confirmation response, the processing unit 810*c* of the processing device 80*c* performs a process related to registration or cancelation of pairing between the processing device 80*b* and the processing device 80*c* according to the process request that is input in step S120 (S132).

Similarly, the processing unit 810*b* of the processing device 80*b* also performs a process related to registration or cancelation of pairing (S134).

As mentioned above, the flow of the processes in the comparison target system 8 has been described. In the above description, the case where the authenticities of both of the processing devices 80*a* and 80*b* are recognized on the basis of a result of calculation using a random number has been described.

However, for example, in step S130, a case is assumed in which the calculation result in step S126 is not valid, and the authenticity of the processing device 80*b* is not recognized. Here, in a case where the predetermined process is a process related to cancelation of pairing, this results in cancelation of pairing between the processing device 80*a* and the processing device 80*b* in a state in which pairing between the processing device 80*b* and the processing device 80*c* remains.

In this case, it is not possible to cancelation the pairing between the processing device 80*b* and the processing device 80*c* on the basis of transmission of a process request that is input from the external device 20, and thus it is necessary to replace components of the processing device 80*b* and the processing device 80*c*.

The technical spirit according to the present invention was conceived by paying attention to the above points, and makes it possible to more reliably complete a series of processes performed by a plurality of devices. Thus, one feature of each of a plurality of processing devices 10 according to the present embodiment is to start a predetermined process on the basis of, among the other processing devices 10, all of the processing devices 10 receiving information from the external device 20 via the processing device 10 having completed the predetermined process normally.

Hereinafter, a flow of processes in the system 1 including a plurality of processing devices 10 having the feature will be described in detail.

Figure 4:
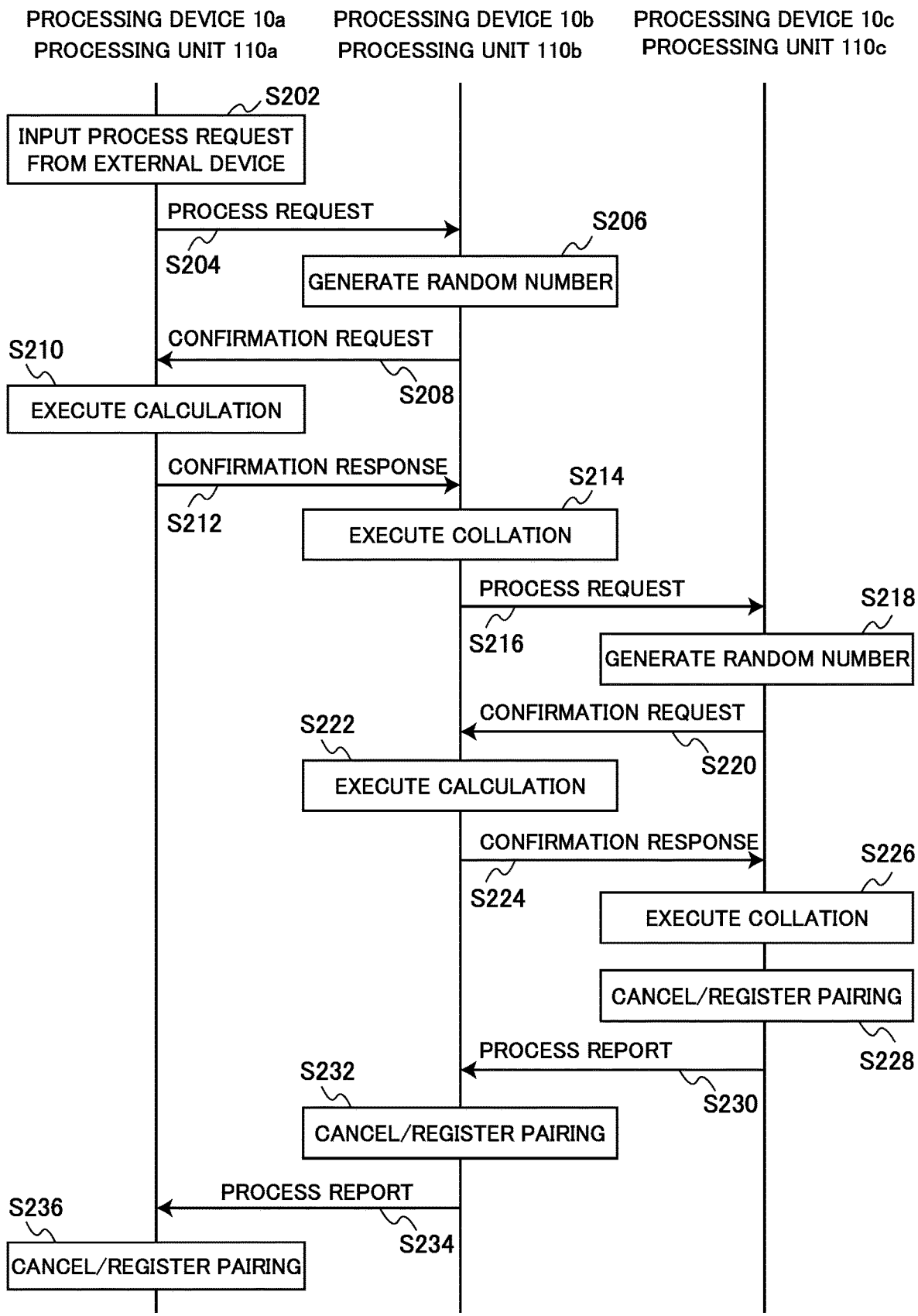
FIG. 4 is a sequence diagram illustrating an example of a flow of processes performed by the system 1 according to the embodiment of the present invention.

FIG. 4 is a sequence diagram illustrating an example of a flow of processes performed by the system 1 according to the present embodiment. In the example illustrated in FIG. 4, the system 1 includes three processing devices 10*a* to 10*c*.

In FIG. 4, it is assumed that the processing device 10*a* is connected to the external device 20. In FIG. 4, it is assumed that the processing device 10*a* and the processing device 10*b* are connected to each other to be able to transmit information, and the processing device 10*b* and the processing device 10*c* are connected to each other to be able to transmit information.

In the following description, a case where a predetermined process executed by each processing device 10 according to a process request is the process of registering or canceling pairing will be described.

In this case, in the processes in the system 1, first, a process request is input to the processing device 10*a* from the external device 20 (S202).

Next, the processing unit 110*a* of the processing device 10*a* performs control such that the process request that is input in step S202 is transmitted to the processing device 10*b* (S204).

Next, the processing unit 110*b* of the processing device 10*b* generates a random number on the basis of the process request that is input in step S204 (S206).

The processing unit 110*b* of the processing device 10*b* performs control such that a confirmation request including the random number generated in step S206 is input to the processing device 10*a* (S208).

Next, the processing unit 110*a* of the processing device 10*a* executes calculation based on the random number included in the confirmation request that is input in step S208 (S210).

The processing unit 110*a* of the processing device 10*a* performs control such that a confirmation response including a result of the calculation executed in step S210 is input to the processing device 10*b* (S212).

Next, the processing unit 110*b* of the processing device 10*b* performs collation based on the calculation result included in the confirmation response that is input in step S212 (S214). For example, the processing unit 110*b* may determine whether or not a result of calculation using the random number generated in step S206 and a code shared in advance between the processing devices 10*a* and 10*b* matches the calculation result included in the confirmation response.

Here, in a case where the authenticity of the processing device 10*a* is recognized as a result of the collation based on the calculation result included in the confirmation response, the processing unit 110*b* of the processing device 10*b* performs control such that the process request that is input in step S204 is transmitted to the processing device 10*c* instead executing a process related to registration or cancelation of pairing (S216).

Next, the processing unit 110*c* of the processing device 10*c* generates a random number on the basis of the process request that is input in step S216 (S218).

The processing unit 110*c* of the processing device 10*c* performs control such that a confirmation request including the random number generated in step S218 is input to the processing device 10*b* (S220).

Next, the processing unit 110*b* of the processing device 10*b* executes calculation based on the random number included in the confirmation request that is input in step S220 (S222).

The processing unit 110*b* of the processing device 10*b* performs control such that a confirmation response including a result of the calculation executed in step S222 is input to the processing device 10*c* (S224).

Next, the processing unit 110*c* of the processing device 10*c* performs collation based on the calculation result included in the confirmation response that is input in step S224 (S226).

Here, in a case where the authenticity of the processing device 10*b* is recognized as a result of the collation based on the calculation result included in the confirmation response, the processing unit 110*c* of the processing device 10*c* performs a process related to registration or cancelation of pairing between the processing device 10*b* and the processing device 10*c* according to the process request that is input in step S216 (S228).

As described above, each of a plurality of processing devices 10 according to the present embodiment may perform collation not only based on, among the other processing devices 10, all of the processing devices 10 receiving information from the external device 20 via the processing device 10 having completed the predetermined process normally but also based on a random number.

For example, each processing device 10, in a case where the authenticity of another processing device 10 having transmitted the process request to the processing device 10 is not recognized as a result of collation, may finish a process without further transmitting the process request.

In other words, among the plurality of processing devices 10 according to the present embodiment, each of the processing devices 10 other than the processing device 10 connected to the external device 20 may execute a predetermined process in a case where all of the processing devices 10 receiving information from the external device 20 via the processing device 10 have completed the predetermined process normally, and a case where a confirmation request including a generated random number is input to another processing device that has transmitted information from the external device 20 to the processing device 10, a confirmation response including a result of calculation executed by using the random number is received from the other processing device, and the authenticity of the other processing device 10 is recognized on the basis of the confirmation response.

According to the process, even in a case where a process request is illegally input, the process request can be rejected, and thus the security can be further increased.

The processing unit 110c of the processing device 10c performs control such that a process report indicating that a process related to registration or cancelation of pairing in step S228 has been completed normally is transmitted to the processing device 10b (S230).

As described above, among the plurality of processing devices 10 included in the system 1 according to the present embodiment, each of the processing devices 10 other than the processing device 10 connected to the external device 20 may transmit an execution result of a predetermined process that is executed on the basis of information received from the external device 20 via another processing device 10, to the other processing device 10.

According to the information transmission, the other processing device 10 receiving the execution result of the predetermined process can understand whether or not the processing device 10 receiving information from the external device 20 via the other processing device 10 has completed a predetermined process normally.

Specifically, in a case of the example illustrated in FIG. 4, the processing unit 110b of the processing device 10b can understand that a process related to registration or concentration of pairing has been completed normally by the processing device 10c on the basis of the process report that is input in step S230.

In the example illustrated in FIG. 4, since there is no processing device 10 receiving information from the external device 20 via the processing device 10b except the processing device 10c, the processing unit 110b of the processing device 10b starts a process related to registration or cancelation of pairing according to the process request that is input in step S204 (S232).

The processing unit 110b of the processing device 10b may start both a process related to registration or cancelation of pairing between the processing device 10b and the processing device 10c and a process related to registration or cancelation of pairing between the processing device 10a and the processing device 10b in step S232.

The processing unit 110b of the processing device 10b performs control such that a process report indicating that the process related to registration or cancelation of pairing in step S232 has been completed normally is transmitted to the processing device 10a (S234).

Next, the processing unit 110a of the processing device 10a starts the process on the basis of all of the processing devices 10 (herein, the processing device 10b and the processing device 10c) receiving information from the external device 20 via the processing device 10a have normally completed the process of registering or canceling pairing by referring to the process report that is input in step S234 (S236).

As described above, the example of the flow of the processes in the system 1 according to the present embodiment has been described. FIG. 4 illustrates the case where the system 1 includes the three processing device 10a to processing device 10c, and the processing device 10a and the processing device 10b are connected to each other to be able to transmit information, and the processing device 10b and the processing device 10c are connected to each other to be able to transmit information.

On the other hand, the above description is only an example, and, as described above, in the system 1 according to the present embodiment, an information transmission relationship among a plurality of processing devices 10 may take various forms.

For example, in a case of the example illustrated in FIG. 1, the processing device 10b may receive a process report from each of the processing devices 10c and 10d, and may execute a predetermined process in a case of confirming that both of the processing devices 10c and 10d have completed the predetermined process normally.

In this case, the processing device 10a may receive a process report from the processing device 10b, and may execute a predetermined process in a case of confirming that both of the processing devices 10b and 10c have completed the predetermined process normally.

According to the flow of the processes, even in a case where an error is recognized in collation performed by any processing device 10, it is possible to execute a process again without replacing components and thus to more reliably complete a series of processes.

2. Appendix

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

A series of processes performed by each device described in the present specification may be realized by using any of software, hardware, and a combination of the software and the hardware. A program configuring the software is stored in advance in, for example, a recording medium (non-transitory medium) provided inside or outside each device. Each program is read to a RAM, for example, when the program is executed by a computer, and is executed by a processor such as a CPU. The recording medium is, for example, a magnetic disk, an optical disc, a magnetooptical disc, or a flash memory. The computer program may be distributed via, for example, a network instead of using the recording medium.

What is claimed is:

1. A system comprising:
a plurality of processing devices that execute a predetermined process according to an input process request,
wherein each of the plurality of processing devices is connected to at least one other processing device such that information is transmittable,
wherein the process request is input from an external device connected to any of the plurality of processing devices,
wherein each of the plurality of processing devices starts the predetermined process on the basis of, among the other processing devices, all processing devices receiving information from the external device via the processing device having completed the predetermined process normally, and
wherein the predetermined process includes a process of canceling pairing or a process of registering pairing between the plurality of processing devices that is necessary to perform a cooperative operation.

2. The system according to claim 1,
wherein, among the plurality of processing devices, each of processing devices other than a processing device connected to the external device transmits an execution result of the predetermined process that is executed on the basis of the information received from the external device via another processing device, to the other processing device.

3. The system according to claim 1,
wherein each of the plurality of processing devices transmits the input process request to at least one other processing device not having received the process request yet.

4. The system according to claim 1,
wherein, among the plurality of processing devices, each of processing devices other than a processing device connected to the external device inputs a confirmation request including a generated random number to another processing device that has transmitted the information from the external device to the processing device, receives a confirmation response including a result of calculation executed by using the random number from the other processing device, and executes the predetermined process in a case where an authenticity of the other processing device is recognized on the basis of the confirmation response.

5. A processing device that is connected to a plurality of devices of the same type and executes a predetermined process according to a process request, the process request being input to any of the plurality of devices of the same type from an external device, the processing device comprising:
a processing unit that starts the predetermined process on the basis of, among the plurality of devices of the same type, all devices of the same type receiving information from the external device via the processing device having completed the predetermined process normally,
wherein the predetermined process includes a process of canceling pairing or a process of registering pairing between the plurality of devices that is necessary to perform a cooperative operation.

6. A non-transitory storage medium storing a program causing a computer to function as a processing device that is connected to a plurality of devices of the same type and executes a predetermined process according to a process request, the process request being input to any of the plurality of devices of the same type from an external device, the program causing the processing device to:
start the predetermined process on the basis of, among the plurality of devices of the same type, all devices of the same type receiving information from the external device via the processing device having completed the predetermined process normally,
wherein the predetermined process includes a process of canceling pairing or a process of registering pairing between the plurality of devices that is necessary to perform a cooperative operation.

* * * * *